Aug. 4, 1970     R. S. DUNCAN ET AL     3,522,557
ACOUSTIC DELAY LINE
Filed July 19, 1963     4 Sheets-Sheet 1
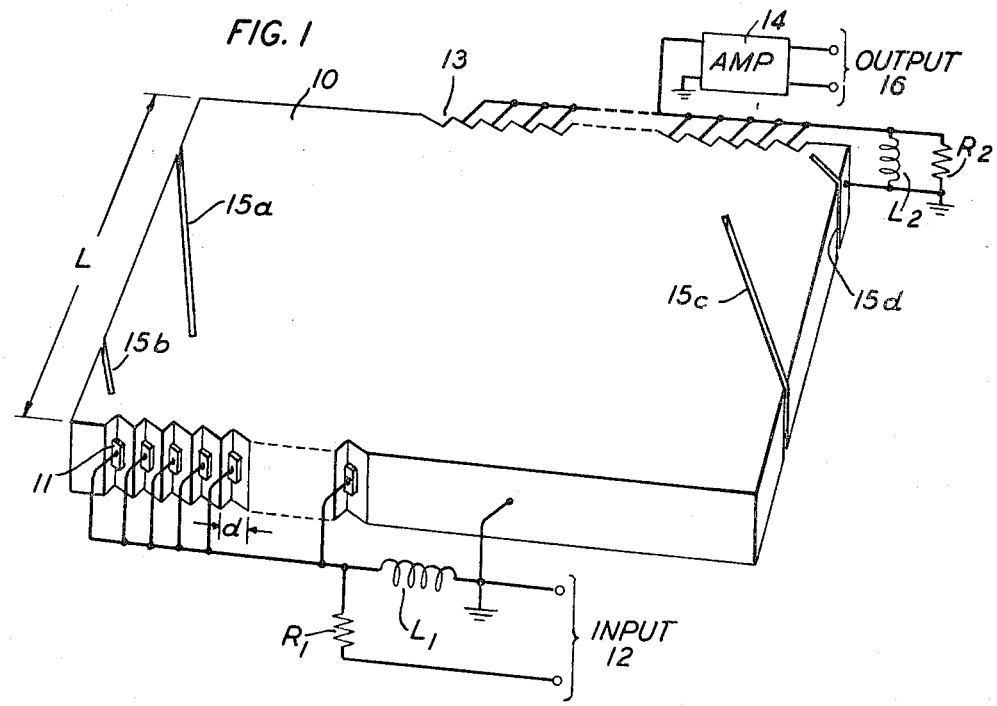
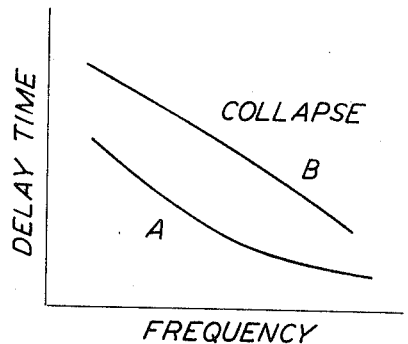
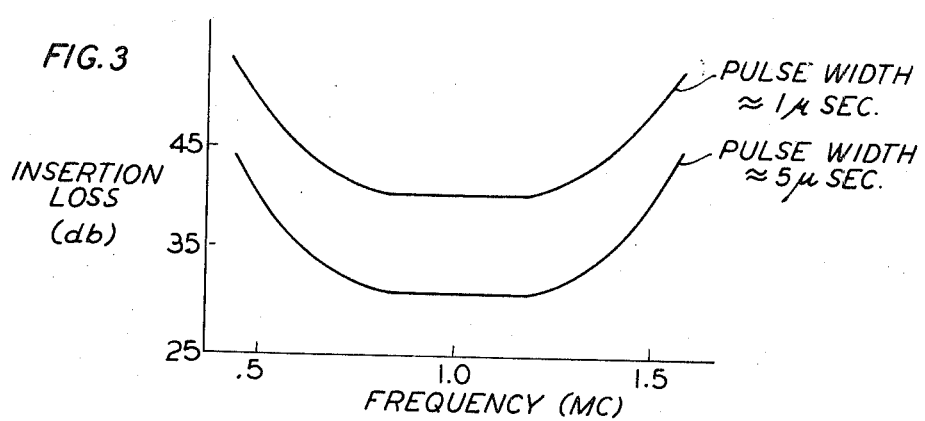
INVENTORS    R. S. DUNCAN
M. R. PARKER, JR.
*G. E. Hirsch Jr.*
ATTORNEY

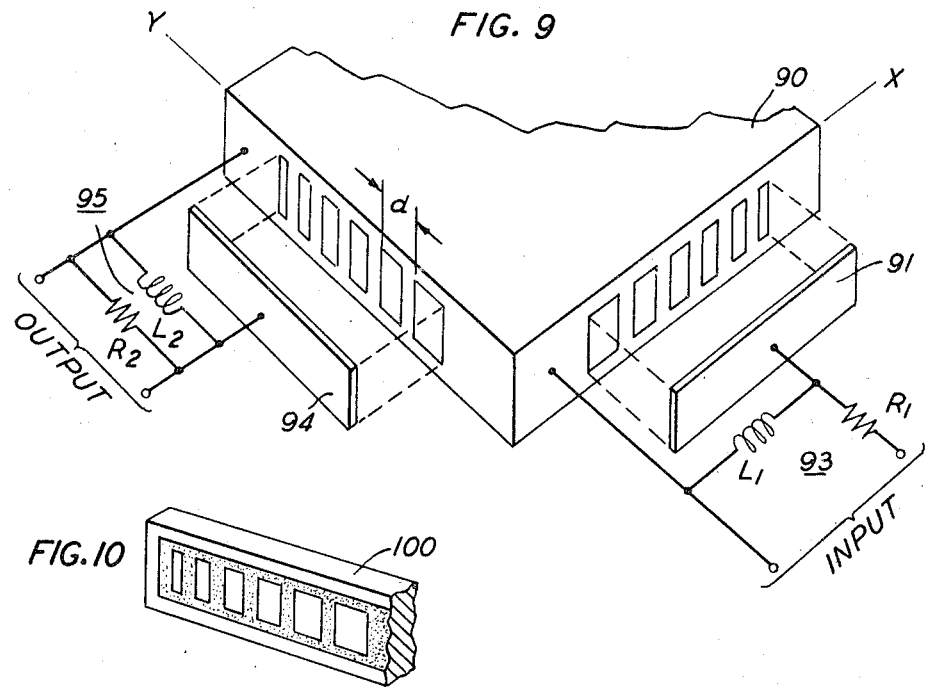

United States Patent Office 3,522,557
Patented Aug. 4, 1970

3,522,557
ACOUSTIC DELAY LINE
Robert S. Duncan and Marsena R. Parker, Jr., Winston-Salem, N.C., assignors to Bell Telephone Laboratories, Incorporated, New York, N.Y., a corporation of New York
Filed July 19, 1963, Ser. No. 296,212
Int. Cl. H03h 9/30
U.S. Cl. 333—30                     32 Claims This invention relates to signal delay apparatus which exhibits a frequency dependent delay characteristic.

The range of detectable targets in a pulsed radar system is largely dependent on average transmitted power. In pulse compression radar systems, particularly of the type described in an article by Klauder, Price, Darlington, and Albersheim entitled "The Theory and Design of Chirp Radars" published in the Bell System Technical Journal for July 1960 at page 745, an increase in average transmitted power is secured by increasing the effective duration of each pulse before transmission. Since range resolution, the ability to separate multiple targets clustered closely together, is a function of the large-frequency content, or bandwidth, of the transmitted radar pulse, and is highest for short duration pulses, the "chirp" system retains the short pulse character of each transmitted pulse. This is done, in effect, by spreading the frequency spectrum of each pulse before transmission. A form of linear frequency modulation is thus used to secure the frequency spread characteristic of a short pulse within the envelope of a long duration signal. At the radar receiver, the resolution potential of the short pulse is realized by a complementary linear frequency demodulation by which the received signal is collapsed into a set of pulses having a sin $x/x$ shape.

This invention relates specifically to ultrasonic apparatus for selectively delaying an applied signal as a function of frequency. Apparatus constructed in accordance with the principles of the invention may thus be used to disperse or collapse applied signals. Consequently, it meets exactly the requirements of pulse compression radar systems.

It is a principal object of the invention to disperse the frequency components of an input pulse or burst in an ordered way within the time domain, or to collapse a sequence of different frequency components of a signal ordered within the time domain into a set of short duration pulses having a sin $x/x$ shape.

It is another object of the invention to expand the frequency range of operation and increase the figure of merit of ultrasonic delay apparatus thus to improve its ability to alter the frequency characteristic of a pulse-like signal. Improved frequency response is desirable to accommodate signals used, for example, in high frequency pulse systems. The figure of merit, defined as the product of time dispersion and bandwidth, is a direct measure of the amount of increase in range resolution produced, for example, in a chirp radar system, for a given maximum output power.

These objects are attained in the present invention by means of a delay structure which both disperses the frequency components of an input wave in space and converts the dispersion in space to a dispersion in time, or, conversely, both converts the time ordered frequency components of a signal into dispersed waves in space and collapses the dispersed space waves into a relatively narrow set of pulses having a sin $x/x$ shape. According to the invention, considering the dispersion mode by way of example, an input signal, either a pulse or burst short enough to contain a particular frequency spectrum, is launched in a delay medium. Preferably, an arrangement is employed which gives rise to the radiation of the pulse signal in the medium as a plurality of individual cylindrical elastic waves. In a simple example, a number of individual transducers, separated physically from one another, may be used. Other arrangements will be described hereinafter. Different frequency components of each radiated wave are consequently propagated in different directions, i.e., via different paths with different path lengths. Since path length determines delay time, a "dispersion" in space is converted to a "dispersion" in time. An output receptor consisting, for example, of one or more individual transducer elements spatially arranged to accept incident signals, collects all frequency components of interest. In the collapse mode, the operation is essentially the reverse, i.e., a number of signals of different frequencies separated on the time scale are merged into a set of pulse-like signals.

It is convenient to use the term "dispersion" in describing the re-arrangement on the time scale of the different frequency components of the applied pulse signal in this fashion, since the phenomenon by which the frequency components of the wave are dispersed into an acoustic spectrum is believed to be in many ways similar to the phenomenon by which an optical frequency signal is dispersed in space by an optical diffraction grating. Thus, it may be said that in both cases, individual frequency components of the many individual waves emerging, in the optical case from a grating, and in the acoustical case from the plurality of effective sources, experience interference so that dispersion results. The method of operation of the diffraction delay line may be viewed in a different light, i.e., as one in which the frequency modulation produced by the delay line results from the summation of the impulse responses from each input transducer element to each output transducer element.

The principles of the invention may be employed to advantage in a number of ways, that is, the delay structure which embodies the principles may take a number of forms. In one simple but effective configuration, one or more individual input transducers, each dimensioned suitably to radiate an individual cylindrical elastic wave in the medium, is used. These are oriented so that their radiating surfaces are parallel to the surface of the output transducer. The output transducer may comprise a number of individual transducer elements electrically interconnected. By adjusting the spacing between transducers and their orientation with relation to the delay medium and the input transducers, variations of delay time with frequency may be controlled. For most applications, a substantial linear relationship is desirable; for others, a nonlinear relationship is more suitable. For example, a logarithm characteristic may be used to compensate for Doppler shift or the like.

Another configuration employs a single input transducer for generating and launching a planar acoustical wave in a medium, and a first periodic arrangement of discontinuities in or associated with the medium responsive to the planar wave for producing and launching a plurality of substantially cylindrical elastic waves. A second periodic arrangement of discontinuities is used in nonparallel alignment with the first array. One output transducer is used. For example, in one configuration, the second array of discontinuities and the output transducer may be placed along a surface of the delay medium which is substantially perpendicular to the plane of the source of cylindrical waves in the medium. In effect, a set of sources of varying separation along an X axis of a coordinate system is employed in such a manner that frequency components emitted by the set strike a set of receivers of varying separation along the Y axis of the system. In another, the input and output transducer elements may be arranged along one of the two edges of a delay medium which meet at an angle of approximately 45 degrees.

Operation of the diffraction delay apparatus of the invention, in any of its various forms, is reciprocal in nature; operation is essentially the same with either set of transducer elements used as the electrical input and with either (the other) set used as the output.

Diffraction delay apparatus constructed in accordance with the principles of the present invention is also suitable for use as a variable delay line. For this application, the frequency spectrum of the input signal burst is made sufficiently narrow that the dispersion produced is negligible. The delay time of the line is then varied by varying the carrier frequency of the input burst. Further, the magnitude of the individual frequency components recovered in an ordered time sequence at the output of such apparatus may be measured to aid in the analysis of the frequency composition of the applied signal.

The invention will be more fully apprehended from the following detailed description of illustrative embodiments thereof taken in connection with the appended drawings, in which:

FIG. 1 is a perspective view of diffraction delay apparatus incorporating the principles of the present invention;

FIG. 2 illustrates a typical time delay versus frequency characteristic of the delay apparatus of FIG. 1;

FIG. 3 shows typical transmission characteristics of diffraction delay apparatus of the sort illustrated in FIG. 1;

FIG. 9 is a view of diffraction delay apparatus according to the invention which shows the system of discontinuities used between the elastic wave transducer and the delay medium;

FIG. 10 shows a generally preferable embodiment of the invention in which the grating is formed by a ladder-like thin metal film pattern applied to the edge of the medium or the adjoining transducer. The film pattern is shown as applied to one side of an ultrasonic transducer in the illustration;

FIG. 11 illustrates a modification of the "perpendicular" diffraction line of FIG. 4 in which a single transducer grating array is used in combination with a 45 degree reflecting surface;

FIG. 12 illustrates a variation of the "folded perpendicular" line of FIG. 11;

Figure 4:
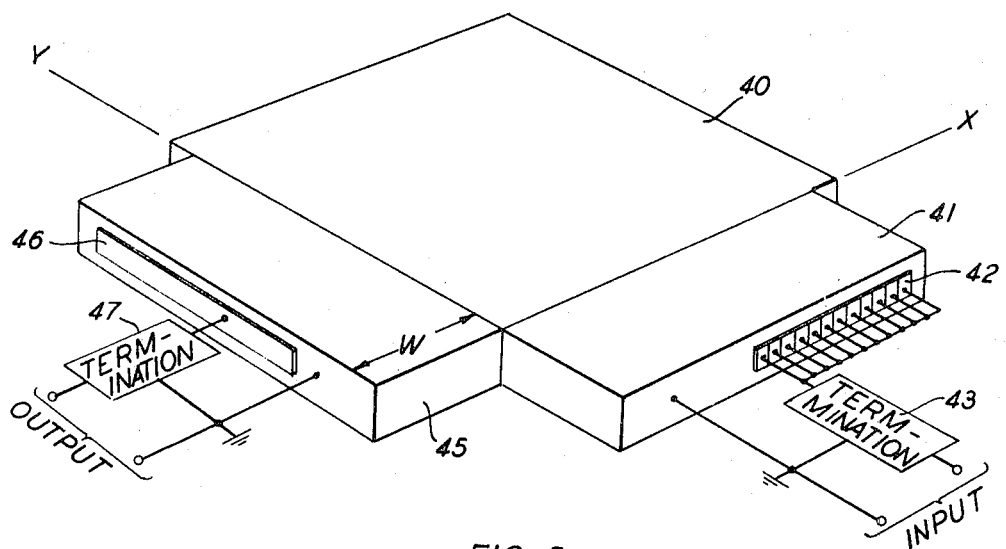
FIG. 4 illustrates diffraction delay apparatus of the invention alternative to that shown illustrated in FIG. 1.

One form of diffraction delay apparatus which turns to account the principles of the invention is shown in FIG. 1. A plate 10 of a delay medium such as aluminum, is equipped with means along one of its edges for launching acoustic signal waves in the plane of the medium. A plurality of individual transducers 11 bonded to the edge of the medium in spaced relation may be used to serve this purpose. They may be mounted in notches cut into the edge of the medium. A sawtooth pattern of this sort corresponds to "blazing" a diffraction grating. With a facet angle of approximately 30 degrees the transducer affixed to each one of the parallel facet edges directs most of the acoustic energy produced under excitation into the medium in the first "order." That is, the energy from each transducer is substantially in the form of a cylindrical wave, and is launched independently of the waves from each of the other transducers. A similar arrangement of sawtooth facets are cut into the parallel opposite edge of plate 10, and a series of individual transducers 13 (not visible in FIG. 1) are mounted on the facet edges parallel to the planes of the input transducers 11. Some of the acoustic energy directed from transducers 11 thus reaches the output transducers at essentially normal incidence.

The transducers may be constructed of piezoelectric crystal or ceramic material, and are preferably bonded to the faces of the facets with solder, epoxy resin cement, or the like. The input and output transducers are polarized along the long dimension of the facet (normal to the plane of plate 10 for elastic shear mode operation. For use as a disperse or collapse device, all of the input transducers are connected in parallel to an external circuit, and all of output transducers are likewise connected in parallel and to an external circuit. Transducer capacitances may be tuned out at the operating frequency by means of shunt inductors, e.g., $L_1$ at the input and $L_2$ at the output, connected to ground and terminating resistors, $R_1$ and $R_2$ or the like. Signals may be supplied at input terminals 12 and recovered by way of amplifier 14.

By way of explanation, it may be assuumed that waves launched from transducers 11 into medium 10 interfere destructively with one another so that the individual frequency components of the input signal burst are dispersed in space within the medium. Although the delay line represents a case of Fresnel diffraction, i.e., diffraction phenomena occurring in the near field, it is, nevertheless, convenient to consider the operation of the delay line as though wave interference occurred in the far field (Fraunhofer diffraction). Accordingly, each frequency component $f$ of wave length $\lambda$ is diffracted by an angle B according to the relation $$d \sin B = 0, \lambda, 2\lambda, \cdots = m\lambda = m\frac{V}{f} \quad (1)$$

where $d$ is the grating spacing, $m$ represents the order number, and V is the velocity of sound in the delay medium. For delay medium 10 of width L and for transducer spacing in the sawtooth edge sufficient to insure first order operation ($m=1$), the delay time for the passage of a wave from an input transducer 11 to an output transducer 13 on an opposite edge at a frequency $$f = \frac{V}{d \sin B}$$

cycles per second can be expressed as $$t = \frac{L}{V} \cdot \frac{1}{\cos B} \sec.$$

If the transducer bandwidth is $f_2 - f_1$ cycles, the delay time dispersion, or expanded pulse length becomes $$\text{delay time dispersion} = \frac{L}{V} \left( \frac{1}{\cos B_2} - \frac{1}{\cos B_1} \right) \quad (2)$$

Thus, waves emanating from transducers 11 are separated into their individual frequency components and reach the transducers 13 in the output array.

In a typical diffraction delay line constructed to exhibit a delay line of approximately 30 microseconds at a frequency of about one megacycle, delay medium 10 is composed of a plate of aluminum alloy about one inch thick, and about twelve by eighteen inches in surface area which exhibits low acoustic loss and has relatively high homogeneity. For operation above ten megacycles per second, fused quartz is more suitable; glass with essentially zero temperature coefficient may also be used. All of these materials are commercially available. The sawtooth notches, both for the input and output transducers, are angled at approximately 30 degrees. Twenty input transducers and forty-two output transducers have been found to provide satisfactory dispersion of 0.5 microsecond pulses, but the exact number is dependent of course on the desired dispersion of the pulse in the output circuit. Transducers of a lead zirconate titanate approximately 0.1 inch wide by 0.7 inch long polarized in the 0.7 inch dimension for shear mode operation are satisfactory. They generally show, after bonding, a resonant frequency of about one megacycle, a resistance of about 200 ohms, and a capacitance of about 450 pf. A grating spacing $d$ of approximately one-quarter of an inch is suitable. For a transducer bandwith which extends from approximately 0.8 to 1.2 megacycles, the delay time dispersion of the medium, determined from Equation 2, equals approximately 30 microseconds.

To eliminate spurious responses, a number of slots 15a, b, c, d, are cut in the surface of delay medium 10 intersecting the edges perpendicular to those supporting the input and output transducers. These slots are angled inwardly from the outer edges and extend to a point approximately on the line connecting the outwardly disposed edges of the input and output transducer arrays. As in prior art, such as May Pat. 2,965,851, these slots interrupt and reflect out of the transmission path any wave energy (minor lobes or spurious reflections) not travelling in the desired path between the input and output arrays. Spurious signals are thus reflected away from the array of output transducers. Alternatively, the edges of the medium may be coated with or covered by an absorbent material. A roughened solder layer or a cloth or plastic layer with an adhesive backing may be used.

FIG. 2 illustrates the delay versus frequency characteristic measured for typical delay apparatus of the configuration illustrated in FIG. 1. Curve A is typical of that associated with apparatus with dimensions approximating those given above. A somewhat more linear characteristic, shown idealized in curve B, can be approached by suitably spacing the individual input transducers 11 and output transducers 13, or by imparting a suitable curvature to the delay medium 10. Simple experimentation can be used to effectuate any desired delay-frequency characteristic.

A typical insertion loss for the apparatus of FIG. 1, measured in db over a frequency range of approximately 0.5 to 1.5 megacycles, is illustrated in FIG. 3. The loss is somewhat higher for narrow pulses than for wider pulses, but is relatively low for both.

For the delay apparatus of FIG. 1, individual transducers are arranged in a "blazing" pattern to take advantage of the maximum in the acoustic radiation pattern of each transducer which is in the direction normal to its major face. At higher frequencies the grating spacing $d$ becomes extremely small, and the transducers must be correspondingly small. To avoid the difficulties resulting from these physical constraints, the individual cylindrical waves may be launched from each of a series of discontinuities in the medium. A machined or etched grating in the edge of the medium excited by a planar wave thus may be used to give rise to a secondary series of cylindrical waves which together constitute the required wave pattern.

Diffraction delay apparatus of the invention which employs a machined grating is shown in FIG. 4. A plate of a suitable delay medium 40 is bounded on one edge, indicated as the X axis of a coordinate system, by an auxiliary plate of delay material 41 to which is attached, along its outer X axis edge, a transducer 42. A single transducer, for example, as shown at 46 is preferred, but, in practice, it has been found more convenient to use commercially avialable transducers with smaller dimensions. These are positioned contiguously along the edge and connected electrically together in an external electrical circuit. Transducers constructed of crystal quartz or of a piezoelectric ceramic material, such as lead zirconate titanate, are satisfactory. They are polarized for operation in the shear mode. Polarization is along the long dimension, that is, along the dimension perpendicular to the plane of medium 40. The transducers are given a thin nickel plating or the like by a chemical process before being bonded by means of an epoxy resin or the like to the edge surface of block 41. Attached in this manner, the input transducer 42 is effective to launch an essentially planar wave in the medium in response to applied signals. The planar wave is directed, however, to strike an array of shallow discontinuities in the form of slots 44 machined in the delay medium which act to diffract the waves. The grating slots may be cut either in the edge of block 40 or block 41. Essentially cylindrical waves are thus launched in delay medium 40 from individual coherent secondary sources spaced $d$ apart. Once launched in the medium, the individual waves may be assumed to interfere with one another in accordance with the principles of wave diffraction so that they are eventually resolved into discrete frequency components at an edge of the delay medium 40 perpendicular to the edge of launching, i.e., at the Y axis of the coordinate system.

To assure that energy reaching edge Y is transferred to the output transducer via essentially planar paths, an auxiliary block 45 may be used to support a second acoustic diffraction grating at the interface created between medium 40 and block 45. A second set of serrations, or discontinuities, is thus provided along the Y axis of the coordinate system. The grating slots 48 of the second set may be cut either in the edge of block 40 or in the edge of block 45. An output transducer 46, positioned on the opposite side of block 45, is employed to collect the resolved wave components from the Y axis of the system. If the width W of block 45 is sufficiently large, the cylindrical waves are essentially planar at the edge supporting transducer 46. That is, with a sufficiently large radius the cylindrical waves emanating from the discontinuities are essentially tangent to the transducer plane when they reach it. Transducer 46 is connected to terminating apparatus 47 and an external set of terminals. A delay line constructed with this configuration is aptly termed a "perpendicular" diffraction delay line.

Figure 5:
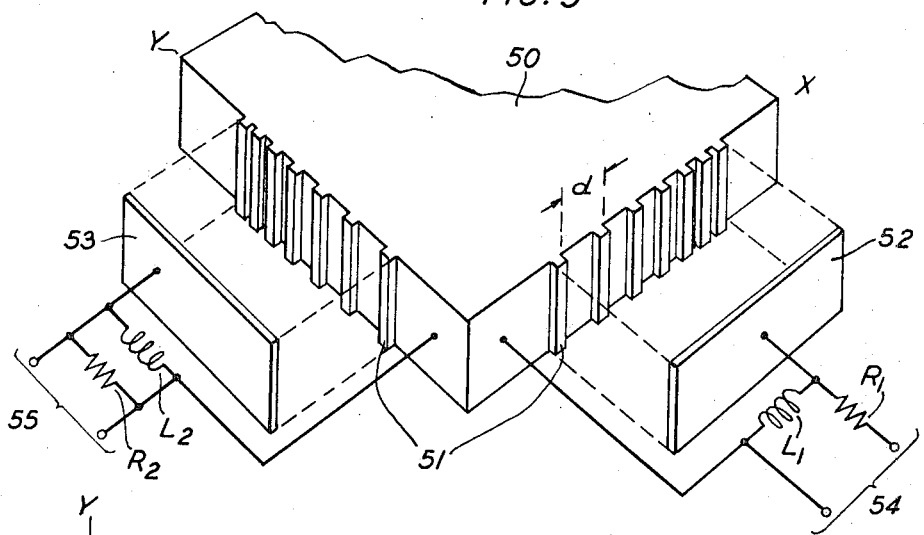
FIG. 5 illustrates a variation of the "perpendicular" delay line of FIG. 4.

FIG. 5 illustrates, in an exploded view, an array of serrations or discontinuities 51 cut into the surface of delay medium 50 along the X and the Y axes of a coordinate system. An input transducer 52 and an output transducer 53 are bonded directly to the serrations. The serrations along the X axis give rise to independent cylindrical waves and the resolved wave components are collected along the Y axis of the delay medium by the output transducer. The spacing between the individual slots in the grating milled into the edges of medium 50 is controlled by an equation relating to wave velocity in the medium, the order of interference, and a constant. The exact relation is developed below in connection with the construction of FIG. 6.

Figure 6:
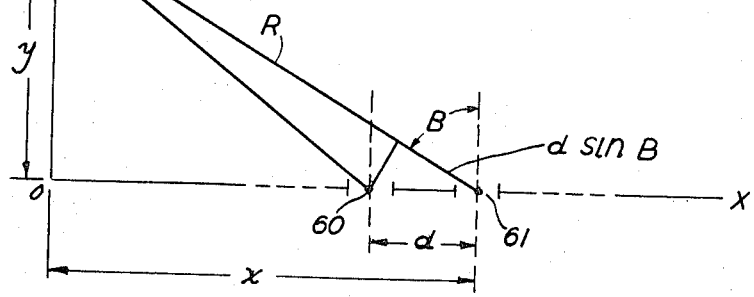
FIG. 6 is a diagram of assistance in explaining principles of diffraction as applied in the practice of the invention.

FIG. 6 illustrates geometrical relations helpful in explaining the operation of the perpendicular diffraction delay line of the invention. Diffraction phenomena for the perpendicular line (FIG. 4) are again of the Fresnel or near field type but are considered to be, for convenience, of the Fraunhofer, or far field, type. An array of secondary sources is positioned along the X axis of a coordinate system in such a manner that waves emitted by the sources strike the Y axis in accordance with relation $t=Kf$, where $f$ represents frequency, $t$ represents delay time, and K is a constant equal to the slope of the delay time-frequency characteristic. Amplitude maxima occur wherever the path difference from corresponding points on adjacent, coherent sources (either transducers or discontinues along X axis), is an integral number of wave lengths. This number is called $m$, and, by analogy, $m$ is termed the order of interference. In the diagram of FIG. 6, a pair of coherent sources 60 and 61 are shown along the X axis separated by a distance $d$. In general, the spacing between individual sources is not a constant. Line R illustrates the distance between one of the sources 61 on the X axis and a point P on the Y axis. A wave of the same frequency emitted by the adjacent source 60 will arrive at P in phase with the first wave if the difference in the distance traveled by the two waves is an integral number of wave lengths. Thus, approximately, $$d \sin B = m\lambda = m \frac{V}{f} \qquad (1)$$

where $m = 0, \pm 1, \pm 2, \ldots$

This evidently is the same relation considered above in connection with the apparatus of FIG. 1. In this relation, B represents the diffraction angle and V is again the wave velocity in the medium. From FIG. 6

$$\sin B = \frac{x}{R} \qquad (3)$$

and, substituting (3) into (1)

$$R = \frac{xd}{mV} \cdot f \qquad (4)$$

but, $$R = Vt \qquad (5)$$

where $t$ is equal to the time required for the wave to traverse the distance R at a velocity V.

Therefore, $$t = \frac{xd}{mV^2} \cdot f \qquad (6)$$

The time at which energy at a frequency $f$ is incident on an acoustic diffraction grating placed along the Y axis is given by Equation 6 and the angle of incidence of this component by $(90° - B)$. If point P of FIG. 6 is replaced by a slot of width $d'$, spaced a distance $y$ along the Y axis, then approximately $$d' [\sin (90°) - B) + \sin B'] = m\lambda \qquad (7)$$

where B' represents the angle at which the wave of frequency $f$ propagates in the minus $x$ direction from the output grating. The diffracted first order will strike the output transducer at normal incidence if the output transducer is parallel to the Y axis and if $B' = 0$. This means that $$d' [\sin (90° - B)] = m\lambda \qquad (8)$$

or, $$d' \cos B - m\lambda = 0 \qquad (9)$$

But, $$\cos B = \frac{y}{R} \qquad (10)$$

so that $$yd' = mR\lambda = xd \qquad (11)$$

If this requirement is satisfied, angle $B' = 0°$, and energy is incident normally on the output transducer. Delay time $t$ will thus be a linear function of frequency if $$\frac{xd}{mV^2} = \frac{yd'}{mV^2} = K \text{ a constant} \qquad (12)$$

where K is equal to the slope of the delay time-frequency characteristic. A delay line with a configuration that meets the terms of Equation 12 will thus exhibit linear frequency modulation.

In the apparatus of FIGS. 4 and 5, therefore, the spacing between the individual slots in the grating milled on the surface X, block 41 in FIG. 4 and 50 in FIG. 5, and the surface Y, block 45 in FIG. 4 and 50 in FIG. 5, will insure a linear delay time versus frequency characteristic for the line if $$xd = yd' = mV^2K, \text{ a constant} \qquad (13)$$

where $d$ and $d'$ are the center line to center line spacing of the serrations along the X axis and Y axis, respectively. The reciprocal nature of the device is evident from Equation 13. Thus, the total delay time of the delay device can be expressed as $$t = Kf + t_0 \qquad (14)$$

where $t_0$ is a fixed delay resulting from the passage of the wave through the transducer blocks. For a diffraction delay line of bandwidth $(f_2 - f_1)$, the delay time dispersion T is $$T = T_2 - T_1 = (f_2 - f_1)K \qquad (15)$$

where $T_2$ is the delay time of frequency $f_2$ and $T_1$ is the delay time of frequency $f_1$. The dispersion factor D thus becomes $$D = (f_2 - f_1)^2 K \qquad (16)$$

Thus, in accordance with these considerations, the several cylindrical waves radiated in medium 40 in the apparatus of FIG. 4, for example, from the array of discontinuities in a plane parallel to the X axis interfere with one another as a function of frequency within the medium and individual frequency components eventually reach the edge Y at divergent points. In a typical diffraction delay line with this configuration, an aluminum alloy plate approximately one and one-quarter inch thick and approximately sixteen inches square is used for the delay medium 40. Both the input transducer block 41 and the output transducer block 45 are constructed of the same alloy material and are typically sixteen inches long and four inches wide. They are held against block 40 by any convenient means, for example, by external clamps (not shown). Good energy transfer from one block to the other is assured by employing a layer of lubricant. The input transducer is constructed of piezoelectric material approximately three inches long, one-half inch wide, and about twenty-four mils thick. As indicated above, and as shown in the figure (42), it may be assembled from a number of smaller transducers contiguously mounted and electrically connected in parallel if a single transducer of the required dimension is not available. The transducer 42 is affixed by means of an epoxy cement with the three inch dimension parallel to the X axis. The wave propagated in the X–Y plane prior to its encounter with the array of discontinuities is, to a good approximation, planar.

The positions and widths of the array of shallow slots 44 and 48 machined in the medium at the interfaces along the X axis and along the Y axis are thus determined from Equation 13 to assure a linear delay time versus frequency characteristic for the delay apparatus. The incident shear wave is somewhat reflected by the slots but transmitted into the delay medium by the regions between the slots. Thus, the regions between the slots function as coherent secondary sources of acoustic waves.

Spurious responses developed in the apparatus of FIG. 4 may be made to occur outside the time domain of interest. Thus, to reduce spurious response resulting from reflection of the zero or minus one orders, a layer of absorbing material, for example, solder about one-quarter inch thick may be deposited on the two outer edges of the delay medium, that is, on the edges opposite those facing the milled discontinuity arrays.

Figure 7:
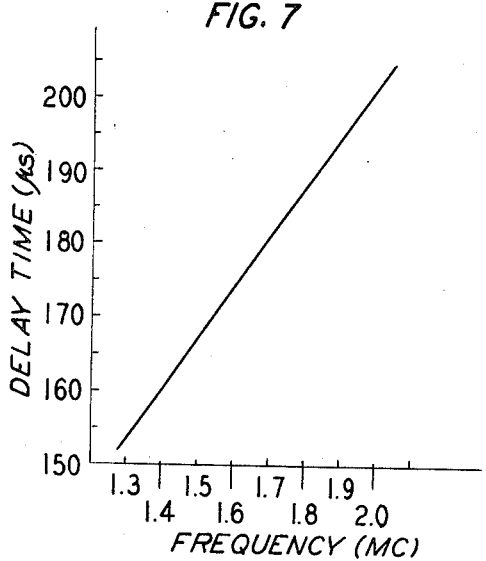
FIG. 7 illustrates a typical delay time versus frequency characteristic of the apparatus of FIG. 4.

FIG. 7 illustrates a typical delay time versus frequency characteristic of apparatus of the form illustrated in FIG. 4. With the diffraction grating milled in the fashion described in the above analysis, especially Equation 13, a relatively linear relation is achieved.

Figure 8:
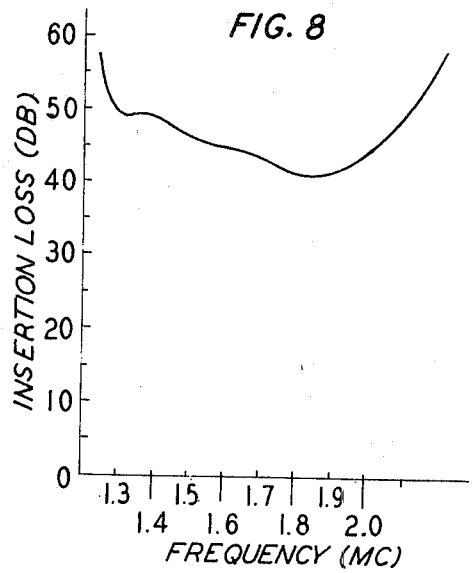
FIG. 8 shows the typical transmission characteristic of delay apparatus constructed in the manner illustrated in FIG. 4.

FIG. 8 shows that the insertion loss over a relatively broad band of frequencies varies by approximately 20 db for a model which has a delay dispersion of approximately 65 microseconds per megacycle. The insertion loss is measured by comparing the peak amplitudes of the input and output envelopes of a gaussian pulse signal. It thus includes acoustic losses in the delay medium and the transducer blocks, in the transducers and epoxy bonds, and a loss which may be termed the diffraction loss. The diffraction loss is composed of reflection losses at each acoustic grating as well as the loss associated with the zero order and minus one order.

It has been found that the grating structure used to deploy a plurality of individual cylindrical waves in the medium may best be formed directly on the delay medium edge by a process of photoetching or the like. FIG. 9 shows a preferred form of delay line of the invention constructed in this manner. Delay medium 90 has on its X axis edge a series of conductive, parallel strips coupled together at both edges to form an array that resembles a ladder. As in the case of the milled grating, the conductive strips are separated one from another by the distance $d$ where $d$ is the center line to center line spacing and is a function of the distance from the X–Y axis junction of the medium according to Equation 13.

The ladder-like conductive grating may be formed as shown in FIG. 9 directly on the edge of medium 90 or, alternatively, it may be plated on the facing edge of transducer 91. As before, transducer 91 may be formed of a number of individual transducers in abutting alignment. A single connection to an external circuit may be used since the X direction edge of the plated ladder structure provides the required parallel connection. A network 93 may be used to provide a proper termination for the device. Along the Y edge of delay medium 90, a similar configuration is used. Thus, transducer 94 is applied directly to the Y edge of the medium. A ladder-like etched grating is included on the interface between transducer 94 and medium 90. It may be applied either to the edge of the medium or to the surface of the transducer. Terminating network 95 couples transducer 94 to an external circuit.

FIG. 10 shows, by way of example, the conductive ladder-like grating applied to the inner surface of a transducer 100. An etching technique well known to those skilled in the art may be employed in producing the grating. Thus, the surface may initially be coated with a photo-resist material and the required pattern may be projected on to the material to create a latent image. Subsequently, the treated surface may be etched to leave the conductive ladder-like pattern. If desired, the facing surface, i.e., the surface on the medium if the pattern is developed on the transducer, or vice versa, may be plated with a smooth conductive surface to insure a good conductive bond between the ladder-like configuration and the adjacent surface.

Since the essential requirement in the delay line constructed, in accordance with the principles of the invention, is that a plurality of individual waves be launched in the medium and collected at individual points whose distances are spaced apart from the input array by a prescribed spatial relation, it is possible to utilize a reflecting surface to allow the individual cylindrical waves to return to the surface from which they were launched. If the geometrical relations in the medium, with regard to the reflecting surface, are properly selected, the several individual frequency components of the applied pulse will be displayed along the X axis surface and may be recovered for use in an external circuit.

FIGS. 11 and 12 show, in outline form, delay lines constructed with a reflecting surface Y′. Medium 110 in each figure thus is a form of the perpendicular delay line of the invention. The Y axis, however, is essentially folded back upon the X axis by means of the reflecting Y′ axis. Preferably the Y′ edge is displaced 45 degrees from the X axis. In operation, signals are applied to an input transducer 111 provided with a grating at the interface of the transducer and the X axis of medium 110. The grating may take any of the forms described hereinabove. Waves launched by way of the grating are reflected at the Y′ surface and eventually reach the X axis again in a time ordered sequence according to frequency. An output transducer supplies the signals to an external circuit. In the apparatus of FIG. 11, signals are supplied by way of a terminating network, $R_1L_1$, directly to input transducer 111, and signals developed by output transducer 115 are transferred to an external circuit by way of a terminating network, $R_2L_2$. In the apparatus of FIG. 12, signals are supplied by way of hybrid apparatus 113 to input transducer 111. The hybrid network, well known to those skilled in the art, is terminated by impedance 114 and serves to direct input signals from terminal 116 to transducer 111 only, and signals supplied from transducer 111 to output terminal 117 only. Thus, although transducer 111 acts alone as the input transducer, transducers 115 and 111 both act to collect energy reaching the X axis and to transfer it to the output circuit. In some applications, this dual function of transducer 111 is advantageous.

It has been found that a single transducer placed along the X axis, not shown, instead of the two individual transducers 111 and 115, shown, may be used. With this arrangement, it is only necessary to space the individual serrations in the grating so that applied pulsive signals and individual frequency components of the signal do not interfere with one another in the output circuit. Careful control of the geometrical relations are sufficient to insure a lack of destructive interference.

Figure 13A:
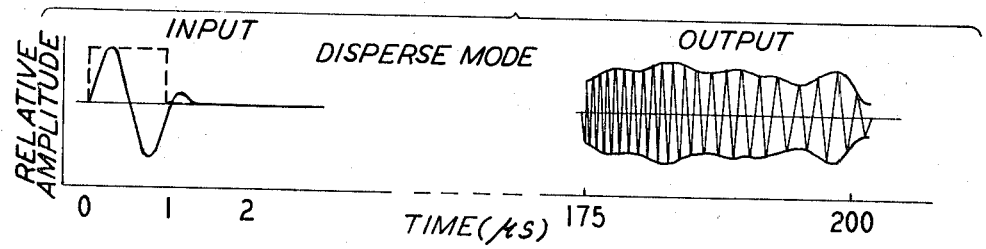
FIG. 13A illustrates two possible input wave forms together with the dispersed signal developed at the output of the diffraction delay apparatus of the invention.
Figure 13B:
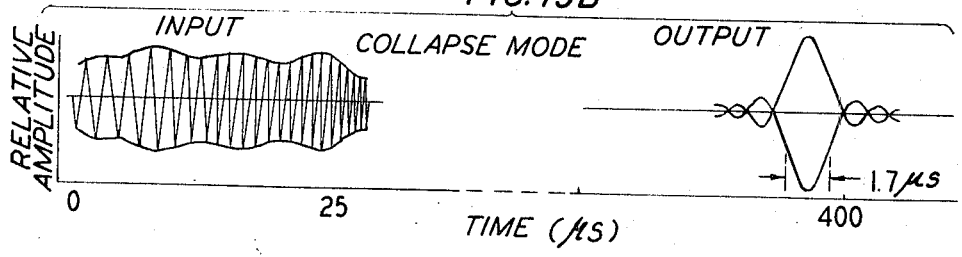
FIG. 13B illustrates the manner by which the diffraction delay line of the invention is employed to collapse the dispersed pulse into a set of pulses having a sin $x/x$ shape.

The disperse and collapse modes of operation of the delay line of the invention are illustrated schematically in FIGS. 13A and 13B, respectively. In the disperse mode of FIG. 13A an input pulse and a burst, each selected to provide a broad frequency spectrum, are illustrated as possible input signals. The envelope of the power density spectrum for an input signal of either of these forms is virtually flat over the pass band of the transducers employed in the line. The portion of the dispersed burst, i.e., the signal available at the output of the dispersive delay line of the invention, is shown at the lower portion of the figure. The frequency components of the input burst are dispersed in time. In a typical example, components of 1.63 megacycles are present at a delay time of 175 microseconds, and components of 1.98 megacycles are present at a delay time of 200 microseconds. This frequency separation in time is illustrated only schematically in the figure, of course. Amplitude variations in the dispersed burst result primarily from errors in the production of the slots of the acoustic gratings, in homogeneity of the aluminum alloy used in the delay medium and transducer blocks, and similar effects. Theoretically, a burst of uniform amplitude is attainable.

Collapse mode operation is illustrated schematically in FIG. 13B. A typical signal in which the frequency components are dispersed in time, e.g., between approximately 1.98 megacycles and 1.63 megacycles in a delay time of 175 to 200 microseconds is shown as the input used to energize the dispersive delay line of the invention. At the output of the delay line, the several frequency components of the input signal are collapsed into the single burstlike signal shown at the lower portion of the figure. In practice, the input signal is collapsed into a set of pulses having a characteristic sin $x/x$ shape.

Figure 14:
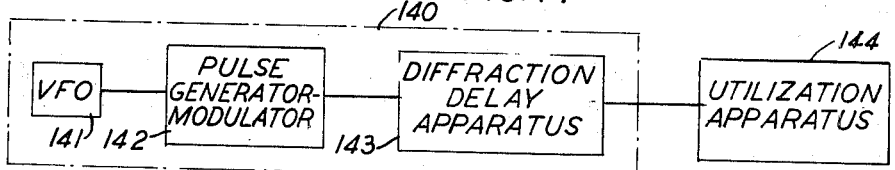
FIG. 14 illustrates in block schematic form a variable delay line which employs diffraction delay apparatus constructed in accordance with the principles of the invention.

Although the diffraction apparatus of the invention has been indicated to be primarily suitable for use in chirp radar systems or the like, it may, of course, be used in a number of other ways. For example, it may be employed as an element of a variable delay line. FIG. 14 illustrates this application of the invention. Variable frequency oscillator 141 is used to modulate pulse signals generated in pulse generator-modulator 142. The modulated signal is then passed by way of diffraction delay apparatus 143 to utilization device 144. Dispersion within delay apparatus 143, which apparatus may be constructed in accordance with the principles outlined above, takes place, of course, as a function of frequency. Since the different frequency components travel via different paths in the medium and arrive at the output transducers at different times, the delay encountered at the single frequency of the applied modulated signal is dependent directly on the modulating frequency emanating from oscillator 141. By varying the frequency of the oscillator, pulse signals may thus be delayed by any desired amount prior to their delivery to apparatus 144.

Similarly, by connecting the output transducers of diffraction delay apparatus to separate measuring circuits, the frequency composition of an applied pulse or burst signal may readily be determined.

Various other modifications of the principles of the invention will occur to those skilled in the art, and various other configurations may be devised without departing from the spirit and scope of the invention.

What is claimed is:

1. Frequency dependent delay apparatus which comprises, a plate of an elastic transmission medium, a plurality of sources of acoustic waves spatially distributed along one edge of said plate for launching individual acoustic waves in said medium in response to an applied signal, means for simultaneously energizing all of said sources with a broad band signal, the plane dimensions of said plate being selected to support near field diffraction of the individual frequency components of said signal waves within said medium whereby a spatial dipersion of said components occurs, and a plurality of signal responsive transducers spatially distributed along an opposite, substantially parallel edge of said plate and connected together electrically for converting the individual frequency components of acoustic waves incident thereon into an ordered sequence of individual signals, each one of said plurality of sources of acoustic waves distributed along one edge of said plate and each one of said plurality of signal responsive transducers distributed along an opposite, susbtantially parallel edge of said plate being bonded to the edge of said plate in an angled notch in the edge of said plate, said notches being angled so that the planes of said individual sources and of said individual transducers are substantially parallel.

2. Frequency dependent delay apparatus as defined in claim 1 wherein said plate of an elastic transmission medium is composed of aluminum alloy which exhibits low acoustic loss and relatively high homogeneity, and said signal responsive transducers are composed of piezoelectric crystalline material.

3. A signal dispersion system comprising a thin sheet of a solid delay medium, means coupled to said medium responsive to an applied electrical signal for launching a plurality of shear acoustic waves in said medium, means acting in concert with said launching means and said medium for spatially separating acoustic waves of different frequencies within said medium with components of different frequency traveling through said body in different directions from said launching means, said means acting in concert with said launching means and said medium including a ladder-like thin conductive grating at the interface of said medium and said launching means, and means coupled to said medium in spaced relation to said launching means for sequentially transforming individual separated acoustic waves in said medium into their electrical signal counterparts and for producing an electrical output representative of the sum of said signal counterparts.

4. A signal dispersion system as defined in claim 3 wherein said means acting in concert with said launching means and said medium for spatially separating acoustic waves of different frequencies within said medium comprises, a ladder-like thin conductive grating plated on the edge of said medium juxtaposed said launching means.

5. A signal dispersion system as defined in claim 3 wherein said means coupled to said medium responsive to an applied electrical signal for launching a plurality of shear acoustic waves in said medium comprises an elastic wave transducer, and wherein said means acting in concert with said launching means and said medium for spatially separating acoustic waves of different frequencies within said medium comprises a ladder-like thin conductive grating plated on the edge of said transducer juxtaposed said medium.

6. Diffraction delay apparatus which comprises, in combination, a thin plate of an elastic transmission material, input transducer means coupled to one edge of said plate, means for energizing said transducer with a broad band signal to develop an acoustic wave in said plate, means including a first periodic arrangement of discontinuities in said plate responsive to said acoustic wave for diffracting said wave in said plate, the alignment of said first periodic arrangement being substantially perpendicular to the plane of said plate, a plurality of output transducer means coupled to an edge of said plate and oriented in non-parallel alignment with said arrangement of discontinuities, means for electrically connecting said output transducer means in parallel, and means for transmitting signals produced by said output transducer means to an external circuit.

7. Diffraction delay apparatus as defined in claim 6 wherein said thin plate of an elastic transmission medium is composed of an aluminum alloy having low acoustic loss over the frequencies of said broad band signal and relatively high homogeneity, and said input and output transducer means for composed of piezoelectric crystalline material.

8. Diffraction delay apparatus as defined in claim 6 wherein said thin plate of an elastic transmission medium is composed of fused quartz having low acoustic loss over the frequencies of said broad band signal and relatively high homogeneity, and said input and output transducer means are composed of lead zirconate titanate.

9. Diffraction delay apparatus as defined in claim 6 which includes in combination therewith, a second periodic arrangement of discontinuities in said medium in substantially non-parallel alignment with said first arrangement of discontinuities, said second arrangement of discontinuities being responsive to diffracted acoustic waves in said plate, whereby a set of acoustic waves is induced in said plate, said set of acoustic waves being directed spatially to intersect said plurality of output transducer means.

10. Diffraction delay apparatus which comprises a thin substantially rectangular plate of a solid delay medium, an input transducer coupled to a first edge of said medium for launching a substantially plane wave in said medium in response to an applied signal, grating means associated with said plate in coupling relation to said input transducer for launching a plurality of individual substantially plane waves in said medium, a plurality of individual output transducers associated with a second edge of said medium, each of said output transducers being dimensioned suitably to accept an individual diffraction wave component at its point of principal focus in said medium, the radiating plane of said input transducer and the planes of said individual output transducers being substantially perpendicular to one another, means for supplying a broad band electrical signal to said input transducer, means for electrically interconnecting all of said output transducers, and means for transmitting signals developed by all of said output transducers together to an external circuit.

11. Diffraction delay apparatus as defined in claim 10 wherein said grating means comprises a periodic arrangement of serrations in said first edge of said medium, and wherein the product of the widths and the respective linear positions of all of said individual serrations along said first edge is a constant.

12. Diffraction delay apparatus which comprises, in combination, a first plate of an elastic transmission material, the length and width dimensions of said first plate each being many times greater than the thickness dimension, an auxiliary second plate of an elastic transmission material having substantially the same length and thickness dimensions as said first plate but a considerably smaller width dimension, means for holding said auxiliary second plate in intimate contact with said first plate so that the edges bounded by said length and thickness dimensions of each form an interface, transducer means coupled to one edge of said auxiliary second plate, means for energizing said transducer with a broad band signal to develop an acoustic wave in said auxiliary second plate, means including a first periodic arrangement of discontinuities in said first interface responsive to said acoustic wave for diffracting said wave in said first plate, said periodic arrangement of discontinuities being oriented substantially perpendicular to the plane defined by the length and width dimensions of said first plate, a plurality of output transducers coupled to an edge of said first plate and oriented in non-parallel alignment with said first arrangement of discontinuities, means for electrically connecting said output transducers in parallel, and means for transmitting signals produced by said output transducers to an external circuit.

13. Diffraction delay apparatus which comprises, in combination, a thin triangular plate of an elastic transmission material, first transducer means coupled to one edge of said plate, means for energizing said transducer with a broad band signal to develop plane acoustic waves in said plate, means including a periodic arrangement of discontinuities at the interface of said plate and said transducer means responsive to said plane acoustic waves for diffracting said waves in said plate, second transducer means coupled to said one edge of said plate, and means for transmitting signals produced by said second transducer means to an external circuit.

14. Diffraction delay apparatus which comprises in combination, a thin triangular plate of an elastic transmission material two edges of which meet at an angle of approximately 45 degrees, first transducer means coupled to one edge of said plate, second transducer means coupled to said one edge of said plate in substantially contiguous alignment with said first transducer means, means including a periodic arrangement of discontinuities at the interface of said transducers and said triangular plate, means for energizing said first transducer means with a broad band signal to develop plane acoustic waves in said plate, and means for transmitting signals produced by said first and said second transducer means in response to the energizing of said first transducer means to an external circuit.

15. In an ultrasonic apparatus: a transducer including a continuous elongated body of piezoelectric material having two opposing plane faces; an electrode array comprising a multiplicity of physically spaced conductive individual members adjacent to one of said faces, the spacing between said individual members of said multiplicity progressively varying along the length of said body; further conductive electrode means adjacent to the face of said body opposite said one face; means for electrically connecting said conductive members of said multiplicity together to produce an output representative of the simultaneous sum of piezoelectric fields developed between each of said multiplicity and said further electrode means.

16. A signal dispersion system comprising an ultrasonic propagation medium, means for launching ultrasonic energy including a multiplicity of frequencies upon said medium which together form a broad wave front propagating therein, and ultrasonic transducer means located a given direction away from said launching means and extending across the path of said wave front, said transducer means including periodic means extending across said wave front for forming a grating and for acoustically responding to different frequencies in said energy at different locations along said wave front and at different distances from said launching means, said transducer means having single electrical output means for producing an output representative of the sum of responses at said different locations.

17. A signal dispersion system according to claim 16 wherein said transducer means extends across said wave front at an acute angle to said given direction such that said frequency responses at said different locations occur at different distances from said launching means.

18. A signal dispersion system comprising an ultrasonic propagation medium, means for launching ultrasonic energy including a multiplicity of frequencies upon said medium for propagation therein, said launching means including means for spatially dispersing said energy with components of different frequency traveling through said body in different directions from said launching means, and ultrasonic transducer means extending across the path of said dispersed energy for acoustically responding at spatially separated locations to said different frequency components arriving from different directions and for producing an electrical output representative of the sum of said separate responses, said transducer means being oriented with respect to said launching means so that said components of different frequency travel different distances therebetween and are delayed unequally in proportion to said distances.

19. A signal dispersion system according to claim 18 wherein said means for spatially dispersing comprises a periodic arrangement of discontinuities interposed between said means for launching and said transducer means.

20. A signal dispersion system according to claim 18 wherein said means for spatially dispersing comprises means for effectively producing a plurality of spaced sources of elastic waves which interfere with each other to produce a diffraction pattern within said medium.

21. A dispersive delay device comprising a body of wave propagating material, input signal means coupled to said body for propagating waves of different frequencies within a predetermined range of frequencies in said body, signal output means coupled to said body and responsive to waves propagated through said body thereto, and at least one graded line grating having different parts adapted to select different frequencies for propagation to the output means, said line grating being so positioned and the graded spacings between the lines thereof being so chosen as to delay waves of different frequencies by different amounts dependent on frequency, whereby a predetermined train of swept frequencies applied to said input means will produce a relatively short pulse of said frequencies at said output means and a short pulse applied to said input means will produce said train of swept frequencies at said output means.

22. A device as claimed in claim 21 wherein the input and output means are separate from said body and are arranged across the wave paths between input and output transducers.

23. A device as claimed in claim 22 and also including absorption means positioned to receive waves to be dissipated and located on surfaces not occupied by said input and output means.

24. A device as claimed in claim 22 and comprising piezo-electric transducers in association with a wave propagating body of fused quartz.

25. A dispersive delay device comprising a body of wave propagating material, input signal means coupled to said body for propagating waves of different frequencies within a predetermined range of frequencies in said body, signal output means coupled to said body and responsive to waves propagated through said body thereto, and at least one graded line grating having different parts adapted to select different frequencies for propagation to the output means, said grating being so positioned and the graded spacing between the lines thereof being so chosen as to delay waves of different frequencies by different amounts dependent on frequency, and the width of the grating lines being graded so that the width is greater where the spacing is greater and less where the spacing is less, whereby a predetermined train of swept frequencies applied to said input means will produce a relatively short pulse of said frequencies at said output means and a short pulse applied to said input means will produce a train of swept frequencies at said output means.

26. A dispersive delay cell comprising a body of wave propagating medium, an extended wave reflector, input signal operated means for propagating beams of waves of different frequencies within a predetermined range of frequencies in different frequency-dependent direction in said body to different parts of said extended wave reflector, and output signal means positioned to receive beams of waves reflected by said reflector, said extended wave reflector comprising means lying in the path of the waves being propagated in differing frequency dependent directions for reflecting said waves to the output signal means, the wave total path lengths from the input signal operated means via the reflector to the output signal means being different for different frequencies whereby different frequency-dependent wave-propagation times are provided by the cell.

27. A cell as claimed in claim 26 wherein the input and output signal means comprise transducers separate from the body but in operative association therewith, the body being merely a wave propagation body.

28. A cell as claimed in claim 27 comprising input and output signal transducers separate from and in association with a wave propagating body of fused quartz.

29. A cell as claimed in claim 26 wherein coatings of wave absorbent material are provided on all surfaces of the body not occupied by the signal input or output means or the reflector.

30. A cell as claimed in claim 26 wherein the waves are transverse waves.

31. A dispersive delay cell comprising a body of wave propagating medium, input signal means including wave initiation means for initiating the propagation of waves within said body and for causing the direction of propagation to vary as a function of the frequency of input signals applied to said input signal means, output signal means, extended wave reflector means lying in the paths of the waves being propagated in frequency determined directions for reflecting said waves to the output signal means, said output signal means separate from said wave propagating means comprising means lying in the path of the reflected waves for producing output signals in response to the reception of reflected waves from said extended reflector means.

32. A dispersive delay cell according to claim 31 wherein said paths of waves from said wave initiation means vary angularly in dependence upon the frequency of input signals applied to said input signal means.

References Cited

UNITED STATES PATENTS

| 2,169,304 | 5/1939 | Tournier | 333—72 |
| 2,416,338 | 2/1947 | Mason | 333—30 |
| 2,455,389 | 12/1948 | Soller | 333—30 |
| 2,643,286 | 6/1953 | Hurvitz | 333—30 |
| 2,965,851 | 12/1960 | May | 333—30 |
| 2,972,111 | 2/1961 | Hoover | 328—56 |
| 3,020,496 | 2/1962 | Fenerstein | 333—30 |
| 3,034,062 | 4/1962 | Gleam | 328—56 |
| 3,041,556 | 6/1962 | Meltzler | 333—30 |
| 3,046,501 | 7/1962 | Dell et al. | 333—30 |
| 3,070,761 | 12/1962 | Rankin | 333—30 |
| 3,300,739 | 1/1967 | Martley | 333—30 |

FOREIGN PATENTS 988,102   4/1965   Great Britain.

HERMAN KARL SAALBACH, Primary Examiner

C. BARAFF, Assistant Examiner

U.S. Cl. X.R.

333—72; 328—56